United States Patent

Heib et al.

[11] Patent Number: 6,072,254
[45] Date of Patent: Jun. 6, 2000

[54] DRIVE DEVICE WITH ELECTRIC MOTOR

[75] Inventors: Johannes Heib, Lauf; Norbert Knab, Appenweier; Volker Aab, Sesslach/Heilgerdorf, all of Germany

[73] Assignee: Robert Bosch GmbH, Stuttgart, Germany

[21] Appl. No.: 09/168,508

[22] Filed: Oct. 8, 1998

[30] Foreign Application Priority Data

Nov. 6, 1997 [DE] Germany .......................... 197 49 009

[51] Int. Cl.$^7$ .......................... H02K 11/00; H02K 7/116; G01B 7/30
[52] U.S. Cl. ...................... 310/68 B; 310/83; 324/207.25
[58] Field of Search .......................... 310/68 B, DIG. 3, 310/83; 324/151 R, 151 A, 173, 174, 176, 207.2, 207.25

[56] References Cited

U.S. PATENT DOCUMENTS

| 3,719,841 | 3/1973 | Ritsema | 310/155 |
| 3,742,243 | 6/1973 | Gamble | 307/106 |
| 4,257,040 | 3/1981 | Shirasaki et al. | 340/671 |
| 4,555,685 | 11/1985 | Maruyama | 355/303 |
| 4,835,505 | 5/1989 | Hattori et al. | 335/302 |
| 5,053,661 | 10/1991 | Kitamura et al. | 310/83 |

FOREIGN PATENT DOCUMENTS

| 42 38 375 A1 | 5/1994 | Germany . |
| WO 91/09198 | 6/1991 | WIPO . |

*Primary Examiner*—Clayton LaBalle
*Attorney, Agent, or Firm*—Michael J. Striker

[57] ABSTRACT

A drive device has an electric motor having a rotor, a rotor shaft rotatable by the rotor, a ring magnet which is rotatable during the operation of the electric motor and having at least one North pole and one South pole, a hall sensor oriented to the ring motor, the ring motor being rotatably supported at a distance from the rotor shaft near the rotor shaft, and a drive wheel arranged on the rotor shaft, the ring magnet being in a driving connection with the drive wheel, the drive wheel having a diameter which is a greater than a diameter of the ring magnet.

4 Claims, 1 Drawing Sheet

DRIVE DEVICE WITH ELECTRIC MOTOR

BACKGROUND OF THE INVENTION

The present invention relates to a drive device for an electric motor.

The German patent document DE 42 38 375 A1 discloses a drive device, for example for moving a movable roof of a vehicle. The drive device includes an electric motor with a rotor which drives a rotor shaft in two rotary directions, and for example a screw transmission driveable by the rotor shaft, a pole on the motor shaft, as well as a hall sensor oriented toward the pole wheel so that when the pole wheel is rotated by the motor shaft, signals are supplied to an evaluating circuit.

The patent document WO 91/091 98 discloses a further drive device, whose permanent magnet is formed as a ring of a magnetizable material and is magnetized so that it has in its periphery a north pole and a south pole. A magnetizing process which is needed for forming the north pole and the south pole is possible technically in a simple manner. Two hall sensors are associated with this permanent magnet and arranged at an angular distance of 90° around the rotary axis. Thereby an evaluating device can determine also the rotary direction in addition to the number of revolutions, from a sequence of signals from both hall sensors. This drive device is used for driving a window lifter, a displacing roof carrier, a mirror adjuster and the like in the vehicle.

SUMMARY OF THE INVENTION

Accordingly, it is an object of present invention to provide a drive device of the above mentioned type, which is characterized by a better resolution of the rotary movement of the rotary shaft.

In keeping with these objects and with others which will become apparent hereinafter, one feature of the present invention resides, briefly stated, in the drive device of the above mentioned type, in which the ring magnet is supported at a distance from the rotary shaft near it and rotatably, and is in a drive connection with a drive wheel which is arranged on the rotor shaft and whose diameter is greater than the diameter of the ring magnet.

During the operation of the drive device, the ring magnet performs more resolutions than the rotor shaft and therefore at least one hall sensor supplies more signals to the evaluating circuit. In other words, the stroke path for a window lifter between the end positions is releasable in a greater number of partial stroke paths. In analogous manner, in a mirror adjuster, the maximum adjusting angle is releasable in smaller adjusting angle units, so that a mirror is oriented finer.

In accordance with a further feature of the present invention, the drive connection includes teeth provided on the periphery of the ring magnet and on the periphery of the drive wheel, wherein the teeth are engageable one after the other. This drive connection operates very reliably.

In accordance with another feature of the present invention the teeth are inclined to the rotary axes of the wheels. Thereby the noise is substantially reduced.

Finally, in accordance with still a further feature of present invention, a ring magnet is composed of permanent magnet powder with a synthetic plastic binder. Such a ring magnet can be produced in a cost favorable manner.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
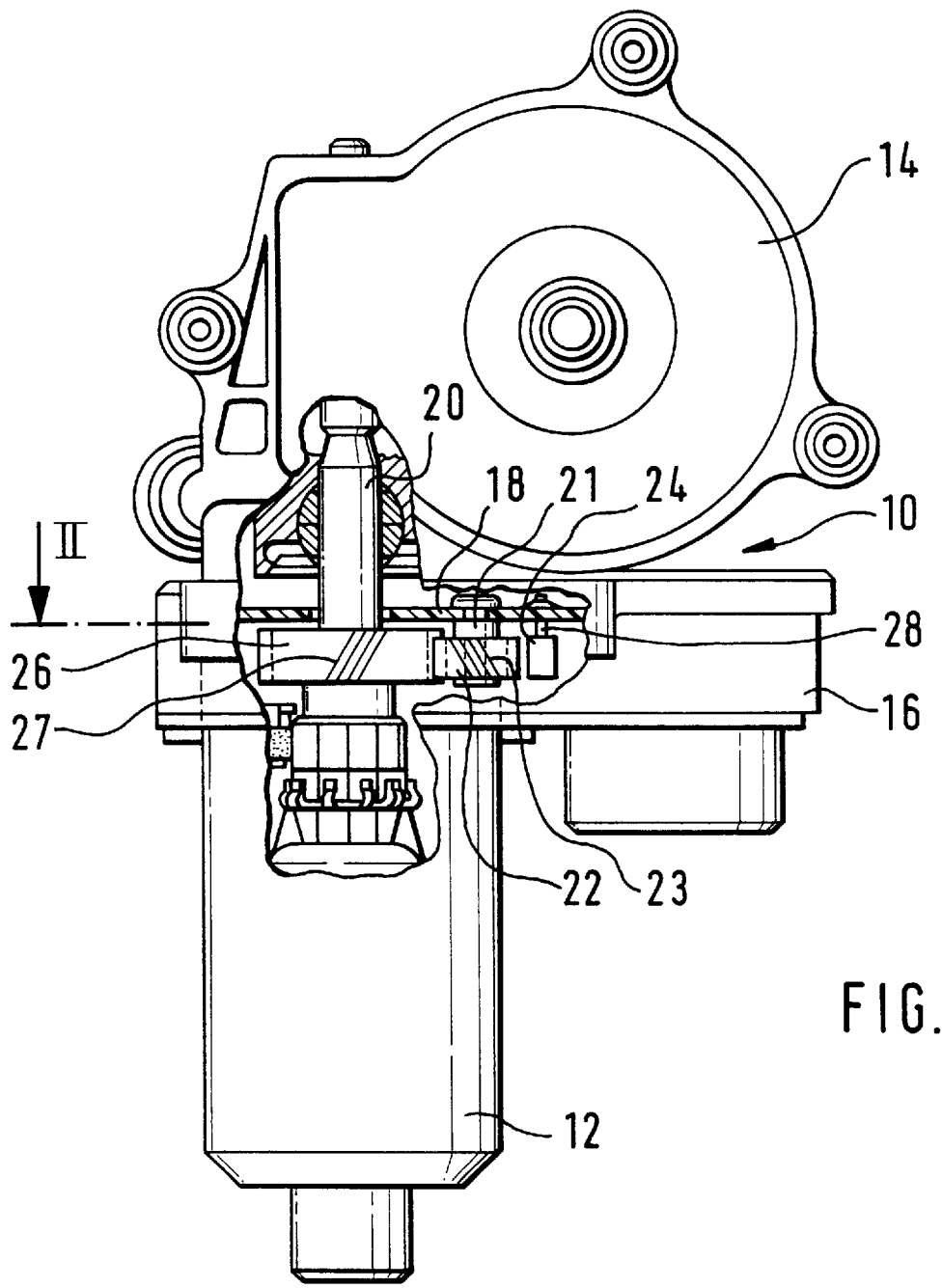
FIG. 1 is a view showing a drive device in a partially sectioned condition along the device.

A drive device in accordance with the present invention shown in FIG. 1 has an electric motor with a reducing transmission formed as a screw transmission 14. The thusly formed drive device 10 operates for adjusting of displacing roofs, window panes and the like in the vehicle.

An electric control device also forms a part of the drive device. It is accommodated in the housing 16 which is for example fixedly connected with the housings of the electric motor 2 and the screw transmission 14. As can be further seen from FIG. 1, a printed circuit board 18 is arranged inside the housing 16. The rotor shaft 20 of the electric motor 12 extends through the printed circuit board 18 with a movement gap. The rotor shaft 20 extends as a transmission screw of the screw transmission 14. A not shown drive pinion which is fixedly connected with the driven shaft of the screw transmission 14 activates for example a not shown window lifter.

The printed circuit board 18 carries not shown conductor tracks and electric components. It forms a part of an evaluating circuit, which detects the revolutions of the rotor shaft 20 and for example determines from this information its rotary speed.

Figure 2:
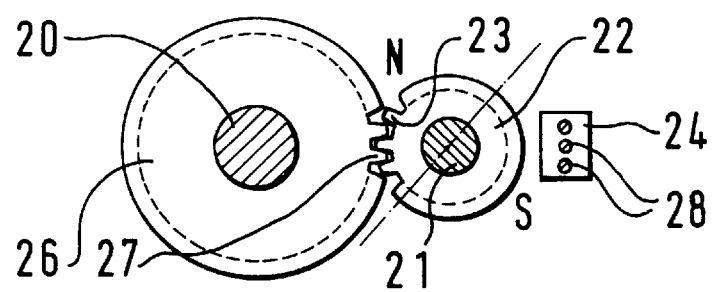
FIG. 2 is an end view of the drive device in accordance with the present invention.

A ring magnet 22 is rotatably supported at a distance near the rotor shaft 20. It is supported by a pin 21 which is connected by riveting with the printed circuit board 18. The ring magnet 22 is shown in FIG. 2.

A dash-dot reference line extending through the center of the ring magnet 22 is located in a longitudinal axis of the ring magnet 22 which separates one half of the ring magnet 22 with which a North pole N is associated, from another half of the ring magnet 22 with which a South pole S is associated. In contrast to the embodiment of FIG. 2, the ring magnet 22 naturally can have several alternating North poles and South poles. The hall sensor 24 is associated with the ring magnet 22. The hall sensor 24 includes connecting wires 28 for electrical connection with conductor tracks and also the mechanical mounting on the printed circuit board 18.

In accordance with the present invention, the ring magnet 22 supported by means of the pin 21 is driveable by a drive wheel 26 which is mounted on the motor shaft 20 and is driven by the motor shaft. In accordance with the present invention, also the diameter of the drive wheel 26 is selected greater than the diameter of the ring magnet 22. As a result, a revolution of the drive wheel 26 is more than a revolution of the ring magnet 22. In the example shown in FIG. 2, the ring magnet 22 performs two revolutions per each revolution of the drive shaft 26.

For providing a reliable rotation of the ring magnet 22, the ring magnet has on its periphery, similarly to the drive wheel 26, a toothed gear with teeth 23 and 27 correspondingly. For counteracting a noise generation during the operation, the teeth 23 and 27 are oriented for example inclinedly to the rotary axes of the toothed wheels 22 and 26, as shown in FIG. 1. It is to be understood that for a person skilled in mechanical art, the drive connection from the drive wheel 26 to the ring magnet 22 which activates it through the teeth 23 and 27 can be also produced in a different way.

However it is a new feature of the present invention that by means of the ring magnet 22 per each number of revolutions of the motor shaft 20 more signals are delivered by the hall sensor 24 than is the case of the drive device in accordance with the prior art.

The ring magnet 22 is price-favorable when it is produced for example of a permanent magnet powder with the use of a synthetic plastic binder. The shape of the ring magnet 22 can be formed for example by injection molding or pressing. The drive wheel 26 can be also produced for example by injection molding or pressing, for example of a synthetic plastic material.

FIG. 1 shows a commutator in a section region a collector. However, the present invention is not limited to a commutator module. In accordance with the present invention, electric motors can be provided which have electronic commutation.

It will be understood that each of the elements described above, or two or more together, may also find a useful application in other types of constructions differing from the types described above.

While the invention has been illustrated and described as embodied in drive device with electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A drive device, comprising an electric motor having a rotor, a rotor shaft rotatable by said rotor; a ring magnet which is rotatable during an operation of said electric motor and having at one half of its circumference only one North pole and at another half of its circumference only one South pole; a Hall sensor oriented to said ring magnet, said ring magnet being rotatably supported at a distance from said rotor shaft near said rotor shaft; and a drive wheel with arranged on said rotor shaft, said ring magnet being in a driving connection with said drive wheel, said drive wheel having a diameter which is a greater than a diameter of said ring magnet.

2. A drive device as defined in claim 1, wherein said ring magnet and said drive wheel each have a periphery provided with teeth so that said teeth of said ring magnet engage said teeth of said drive wheel to form said driving connection.

3. A drive device as defined in claim 1, wherein said teeth of said ring magnet and said teeth of said drive wheel are oriented inclinedly to rotary axes of said ring magnet and said drive wheel.

4. A drive device as defined in claim 1, wherein said ring magnet is composed of a permanent magnet powder with a synthetic plastic binder.

\* \* \* \* \*